United States Patent
Seo

(10) Patent No.: US 7,684,492 B2
(45) Date of Patent: Mar. 23, 2010

(54) APPARATUS AND METHOD FOR RECOVERING LOST BLOCK OF IMAGE PROCESSING SYSTEM

(75) Inventor: Kwang-Deok Seo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1426 days.

(21) Appl. No.: 11/006,562

(22) Filed: Dec. 8, 2004

(65) Prior Publication Data
US 2005/0141622 A1 Jun. 30, 2005

(30) Foreign Application Priority Data
Dec. 24, 2003 (KR) .................. 10-2003-0096868

(51) Int. Cl.
H04N 7/12 (2006.01)
(52) U.S. Cl. .................. 375/240.27; 375/240.01; 375/240.16; 375/240.24; 348/700
(58) Field of Classification Search ............ 375/240.01, 375/240.16, 240.24
See application file for complete search history.

(56) References Cited

U.S. PATENT DOCUMENTS

| | | | | |
|---|---|---|---|---|
| 5,247,363 A | 9/1993 | Sun et al. | | |
| 5,621,467 A * | 4/1997 | Chien et al. | ............ | 375/240.15 |
| 5,912,707 A | 6/1999 | Kim | ............ | 348/415 |
| 6,636,565 B1 | 10/2003 | Kim | ............ | 375/240.27 |
| 7,110,454 B1 * | 9/2006 | Chakraborty | ............ | 375/240.16 |
| 2005/0033505 A1 * | 2/2005 | Zatz | ............ | 701/117 |

FOREIGN PATENT DOCUMENTS

| | | |
|---|---|---|
| JP | 9-187016 | 7/1997 |
| KR | 000032572 | 6/2000 |
| KR | 1020020073680 | 9/2002 |

OTHER PUBLICATIONS

Chinese Office Action dated Oct. 13, 2006.
Japanese Office Action dated Oct. 2, 2007.

* cited by examiner

*Primary Examiner*—Andy S. Rao
*Assistant Examiner*—Geepy Pe
(74) *Attorney, Agent, or Firm*—KED & Associates, LLP

(57) ABSTRACT

A method for recovering a lost block of an image processing system, which includes determining characteristics of a lost block by using a cost function with respect to the lost block, and recovering the lost block by applying an error concealment method that is best suitable for the characteristics of the lost block. Because an image is restored by applying the most suitable error concealment method according to characteristics of the lost block, error restoration performance of a receiving end is improved and the closest image of an original image can be reproduced.

27 Claims, 3 Drawing Sheets

APPARATUS AND METHOD FOR RECOVERING LOST BLOCK OF IMAGE PROCESSING SYSTEM

CROSS-REFERENCE TO A RELATED APPLICATION

This application claims the benefit of the Korean Application No. 96868/2003 filed on Dec. 24, 2003, which is hereby incorporated by reference in its entirety.

BACKGROUND OF THE INVENTION

1. Field of the Invention

The present invention relates to a video processing technique, and more particularly to an apparatus and method for recovering a lost block of an image processing system that applies a different error concealment method according to characteristics of a lost block.

2. Description of the Related Art

Recently, as interests in multimedia contents services are increasing, video processing techniques for restoring various video signals transmitted through communication media are becoming more and more important.

Video includes several frames each with different screen characteristics and motion degree. Further, each frame includes macroblocks with a size of 16×16 pixels, for example, which is the unit of image coding.

In addition, video is compressed using a DCT (Discrete Cosine Transform) technique, a variable length coding technique, a motion compensation coding technique, etc. and if a video block is lost due to an error generated during the coding process or during the transmission process, the picture quality of a restored image is degraded.

SUMMARY OF THE INVENTION

Accordingly, one object of the present invention is to at least address the above-noted and other objects.

Another object of the present invention is to automatically determine the characteristics of an image block lost during transmission and apply an error concealment method most suitable for the characteristics of an image block by a receiving side.

To achieve at least the above objects in whole or in parts, the present invention provides a novel apparatus for recovering a lost block including a lost block detector for determining whether there is a lost block in a received image block, a pixel difference calculator for calculating a temporal difference value ($cost_1$) between adjacent pixels of a current frame with a lost block and a previous frame, and a variance value calculator for calculating a motion vector variance value ($cost_2$) of adjacent blocks to the lost block. The apparatus also includes a block characteristic determining unit for determining characteristics of the lost block by comparing the temporal difference value ($cost_1$) and the motion vector variance value ($cost_2$) with a pre-set threshold value, and a lost block recovering unit for recovering the corresponding lost block by applying an optimum error concealment method according to the characteristics of the lost block. The present invention also provides a novel method for processing a lost block.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings wherein.

BEST MODE OF THE INVENTION

An apparatus and method for recovering a lost block of an image processing system according to the present invention will now be described.

To recover the lost block closely to an original image by complementing the lost block, various error concealment techniques are applied. To select an error concealment technique most suitable for each video block, the characteristics of a corresponding lost block is accurately recognized. Namely, the characteristics of the lost block can be utilized as a significant reference in selecting an optimum error concealment technique that can be applied to each video block.

Figure 1:
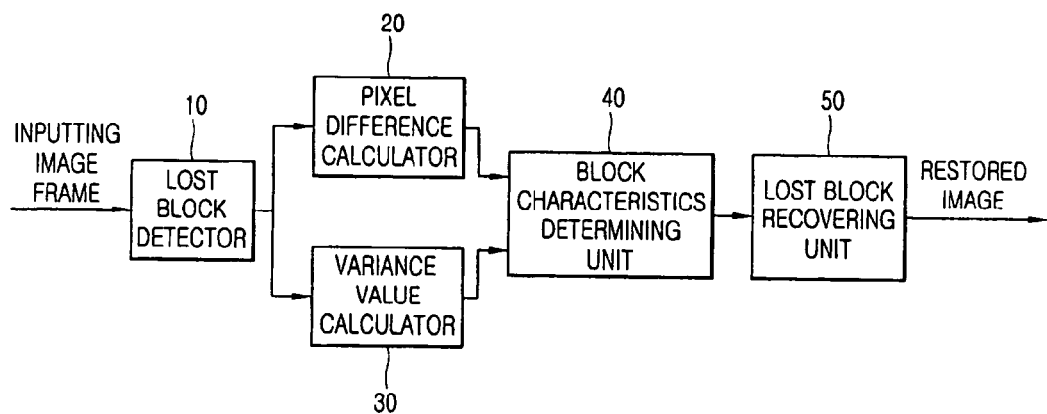
FIG. 1 is a block diagram of an apparatus for recovering a lost block of an image processing system according to the present invention.

FIG. 1 is a block diagram of an apparatus for recovering a lost block of an image processing system according to the present invention.

As shown, the apparatus includes a lost block detector 10 for determining whether there is a lost block in transmitted video blocks; a pixel difference calculator 20 for calculating a temporal difference value ($cost_1$) between adjacent pixels of a current frame and a previous frame when a lost block is detected by the lost block detector 10; and a variance value calculator 30 for calculating a variance value ($cost_2$) with respect to a motion vector of a neighboring block with respect to the lost block when the lost block Is detected by the lost block detector 10. Also shown are a block characteristic determining unit 40 for determining the characteristics of the lost block by comparing the inter-pixel temporal difference value ($cost_2$) and the motion vector variance value ($cost_2$) with a pre-set threshold value; and a lost block recovering unit 50 for recovering the corresponding lost block by applying an error concealment method according to the characteristics of the lost block determined in the block characteristics determining unit 40.

In more detail, the pixel difference calculator 20 calculates the temporal difference value ($cost_1$) between the adjacent pixels of the lost block from the current frame and the previous frame using equations (1) and (2) shown below. Further, the cost function is defined by the number of pixels, adjacent to the lost block, that are greater than a certain threshold value when pixels of a previous frame and pixels of a current frame are compared.

$$\cos t_1 = \sum_{i=1}^{64} \text{Diff}_i \qquad (1)$$

$$\text{Diff}_i = \begin{cases} 1 & \text{if } |curr_i - prev_i| \geq Threshold_{Diff} \\ 0 & \text{otherwise} \end{cases} \qquad (2)$$

where $curr_i$ is pixel values around the lost block and $prev_i$ is pixel values around a block placed at the same position as the current lost block of the previous frame.

A small temporal difference value ($cost_1$) between pixels means there is not much change in the lost block in the previous frame and the current frame. On the contrary, a large temporal difference value ($cost_1$) between the pixels means the motion of the lost block is big or a screen switch has occurred.

In addition, the variance value calculator 30 calculates the variance value ($cost_2$) of a motion vector of neighboring blocks with respect to the lost block using equations (3) and (4) shown below:

$$\cos t_2 = \sum_{i=1}^{7} MV_i^2 - \left[\sum_{i=1}^{7} MV_i\right]^2 \qquad (3)$$

$$MV_i = \sqrt{MV_{ix}^2 + MV_{iy}^2} \qquad (4)$$

where $MV_{ix}$ and $MV_{iy}$ are horizontal and vertical components of $MV_i$, respectively.

A small motion vector variance value ($cost_2$) means that seven motion vectors around the lost block have similar values and a large motion vector variance value ($cost_2$) means that motion vectors are distributed so wide that a motion of a neighboring block is not uniform.

Further, the block characteristics determining unit 40 determines characteristics of the lost block by comparing the temporal difference value ($cost_1$) between pixels and the motion vector variance value ($cost_2$) with a pre-set threshold value.

The characteristics of the lost block can be classified into five types, for example, including 'scene change', 'object moving', 'no movement', 'camera moving' and 'otherwise' types.

The 'scene change' type is a block where a scene change has occurred between frames, and the 'object moving' type is a block where there is a subject moving without directionality. The 'no movement' type is a block where there is little motion like the background of a still camera image, and the 'camera moving' type is a block where an image has a similar motion on the whole as if the camera moved. The 'otherwise' type is a block that does not belong to the above four classification types.

Table 1 shows threshold values of making a reference in determining characteristics of a lost block by the block characteristics determining unit 40. Each threshold value is statistically calculated value using the above equations (1) (4).

TABLE 1

|  | $\cos t_1$ | $\cos t_2$ |
| --- | --- | --- |
| Scene change | $\cos t_1 \geq 60$ | — |
| Camera moving | $\cos t_1 \geq 30$ | $\cos t_2 \leq 50$ |

TABLE 1-continued

|  | $\cos t_1$ | $\cos t_2$ |
| --- | --- | --- |
| Object moving | $\cos t_1 \geq 30$ | $\cos t_2 \geq 150$ |
| No movement | $\cos t_1 \leq 25$ | $\cos t_2 \leq 25$ |
|  | Otherwise | Otherwise |

In addition, the block characteristics determining unit 40 calculates the inter-pixel temporal difference value ($cost_1$) of the lost block and the motion vector variance value ($cost_2$), and then determines whether a threshold value range cost function is identical to determine the characteristics of the lost block.

Figure 2:
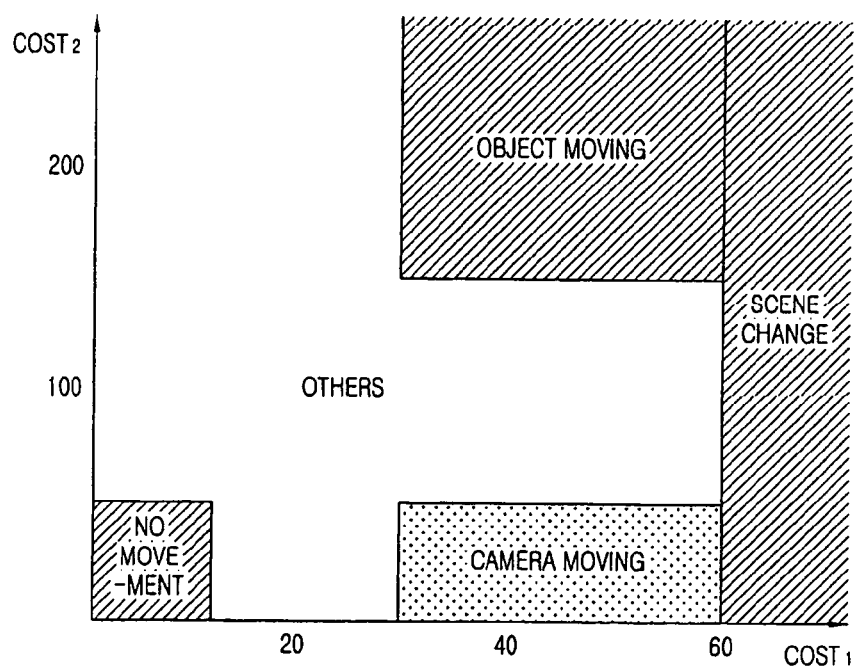
FIG. 2 is a graph showing a distribution of the characteristics of each lost block defined in Table 1.

Turning now to FIG. 2, which is a graph showing a distribution of the characteristics of each lost block defined in Table 1. As shown, a lost block having a little motion or a little difference between a current frame and a previous frame is distributed at a lower portion of the left side, and a lost block having a large motion or a large temporal difference between screens is distributed at an upper portion of the right side. The characteristics for the 'object moving' and 'camera moving' types are also shown.

Further, the lost block recovering unit 50 recovers a corresponding lost block by applying an optimum error concealment method according to characteristics of the lost block determined in the block characteristics determining unit 40.

The error concealment method conceals an error using neighboring information of the lost block during a processing of decoding image data and classified into temporal replacement concealment, spatial concealment, and motion compensated temporal concealment depending on the type of information.

Table 2 shows examples of optimum error concealment methods according to characteristics of the lost block.

TABLE 2

| Characteristics of lost blocks | Error concealment |
| --- | --- |
| Scene change | Spatial concealment |
| Camera moving | Motion compensated temporal concealment |
| Object moving | Spatial concealment |
| No movement | Temporal replacement concealment |
| Otherwise | Motion compensated temporal concealment |

As shown, if the characteristic of the lost block is the 'scene change' type or 'object moving' type, the corresponding lost block is recovered using the spatial concealment method. Further, if the characteristic of the lost block is the 'no movement' type, the lost block is recovered using the temporal replacement concealment method, and if the lost block is the 'camera moving' type, the error of the corresponding lost block is recovered using the motion compensated temporal concealment method.

Namely, if there is little correlation between image screens, the spatial concealment method is applied, while if there is much correlation between image screens, the temporal replacement concealment method is applied.

Figure 3:
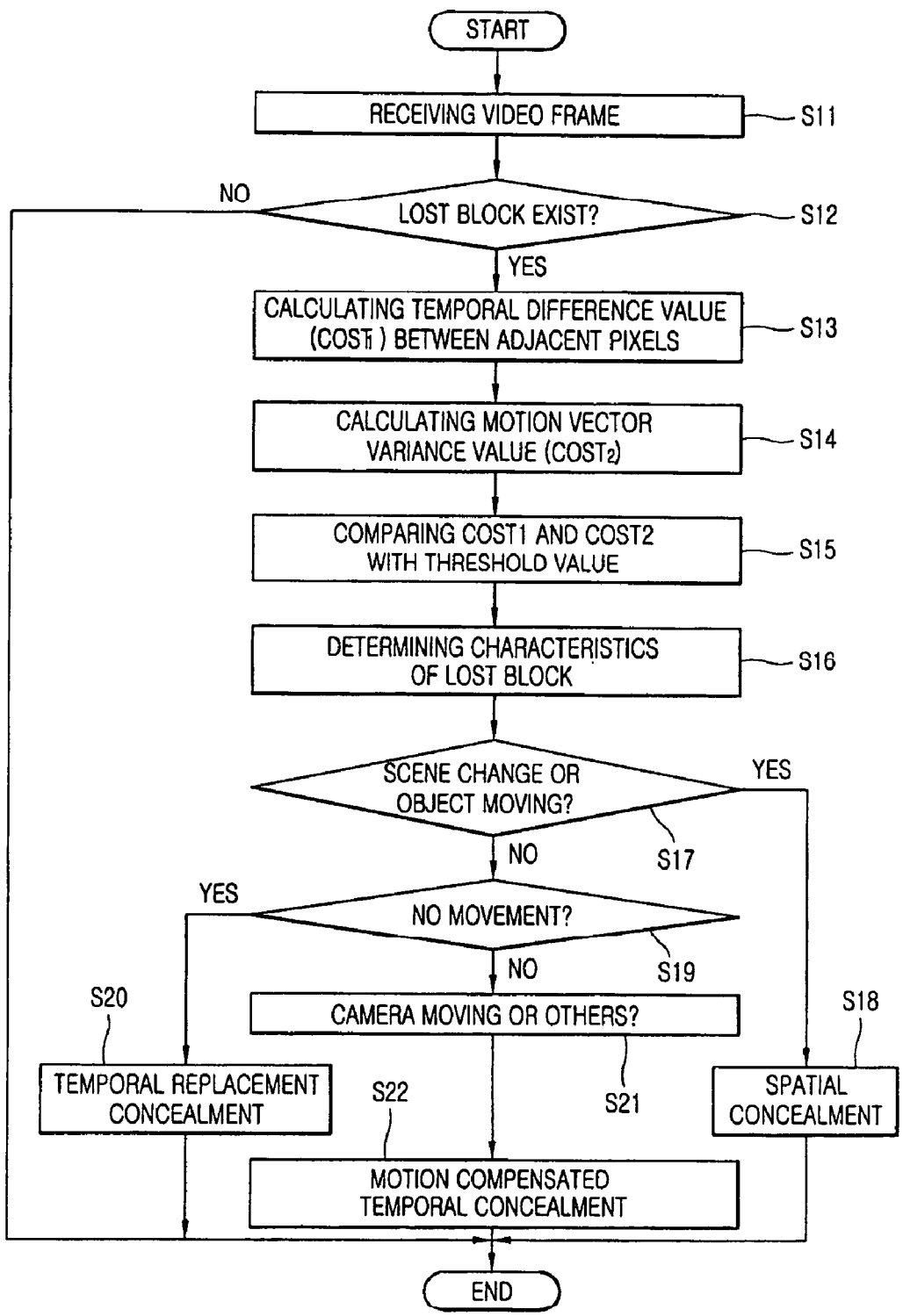
FIG. 3 is a flowchart illustrating a method of recovering a lost block of an image processing system according to the present invention.

Next, FIG. 3 is a flowchart of a method for recovering a lost block of an image processing system according to the present invention. As shown, when an image frame is received from a sending side (not shown) (step S11), the lost block detector 10 determines whether there is a lost block in the image frame (step S12).

If a lost block of the image frame is detected (yes in step S12), a temporal difference value ($cost_1$) between pixels adjacent to the lost block of the current image frame and pixels existing at the same positions of the previous image frame is calculated (step S13). Then, a motion vector variance value ($cost_2$) of a neighboring block with respect to the lost block in a current image frame (step S14) is calculated. In this instance, the inter-pixel temporal difference value ($cost_1$) is calculated using equations (1) and (2), while the motion vector variance value ($cost_2$) is calculated using equations (3) and (4).

Further, the block characteristics determining unit 40 determines the characteristics of the lost block (step S16) by comparing the temporal difference value ($cost_1$) between pixels and the variance value ($cost_2$) of the motion vector with the pre-set threshold values (step S15).

The pre-set threshold value may be obtained by statistically analyzing a relation between the characteristics of the four types of lost blocks and the cost function through experimentation, for example. The pre-set threshold values are as shown in Table 1.

If the inter-pixel temporal difference value ($cost_1$) and the variance value ($cost_2$) of the motion vector are equal to or smaller than a first threshold value (T1), respectively, the characteristics of the lost block is determined as a 'no movement' type. If the inter-pixel temporal difference value ($cost_1$) is equal to or smaller than a second threshold value (T2) and the variance value ($cost_2$) of the motion vector is equal to or smaller than a third threshold value (T3), the characteristics of the lost block is determined as a 'camera moving' type. Further, if the inter-pixel temporal difference value ($cost_1$) is equal to or greater than the second threshold value (T2) and the variance value ($cost_2$) of the motion vector is equal to or greater than a fifth threshold value (T5), the characteristics of the lost block is determined as a 'object moving' type. Also, if the inter-pixel temporal difference value ($cost_1$) is equal to or greater than a fourth threshold value (T4), the characteristics of the lost block is determined as a 'screen change' type (T1<T2<T3<T4<T5).

The lost block recovering unit 50 then recovers the corresponding lost block by applying the optimum error concealment method according to characteristics of the lost block determined by the block characteristics determining unit. In this instance, the optimum error concealment method by characteristics of the lost block is as shown in Table 2.

If the characteristics of the lost block is determined as a 'scene change' type or 'object moving' type (yes in step S17), the corresponding lost block is recovered using the spatial concealment (step S18). If the characteristics of the lost block Is determined as a 'no movement' (yes In step S19), the corresponding lost block is recovered using the temporal replacement concealment method (step S20), because the block of the current frame and the block of the previous frame are quite similar. If the characteristics of the lost block is determined as a 'camera moving' type (step S21), an error of the corresponding lost block is recovered using the motion compensated temporal concealment method (step S22), because the motion of the lost block and the motion of the neighboring blocks are almost the same.

In addition, the spatial concealment is a method for recovering the lost block through linear interpolation from adjacent pixels of the lost block, and the temporal replacement concealment is a method for recovering the lost block by substituting it with a block placed at the same position of the previous frame.

Further, the motion compensated temporal concealment is a method for recovering the lost block by searching a block at the most suitable position in the previous frame using a motion vector that can be restored around the lost block and substituting it with the corresponding suitable block. In this instance, the motion vector of a neighboring block of the lost block is detected, and an intermediate value between the motion vectors is calculated and set as a motion vector of the lost block.

In the present invention, the spatial concealment method has a high efficiency of error recovery when there is little correlation between image screens, while the temporal replacement concealment method has a high efficiency of error recovery when there is much correlation between image screens. Thus, the optimum error concealment method is applied according to such characteristics of the lost block.

Figure 4:
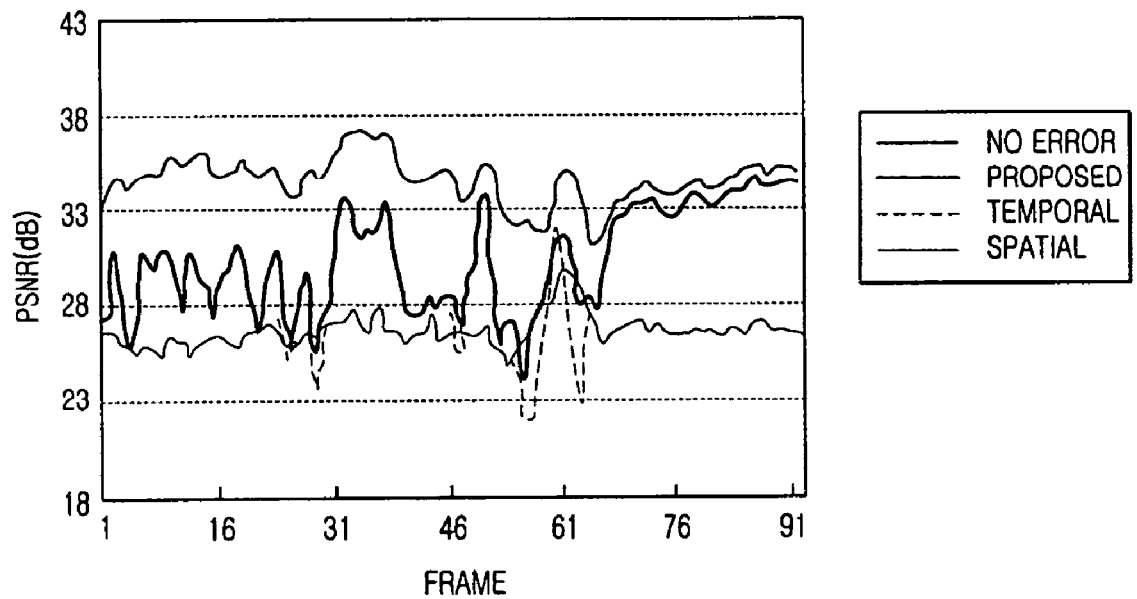
FIG. 4 is a graph showing PSNRs (Peak Signal-to-Noise Ratios) of each frame of a foreman image.
Figure 5:
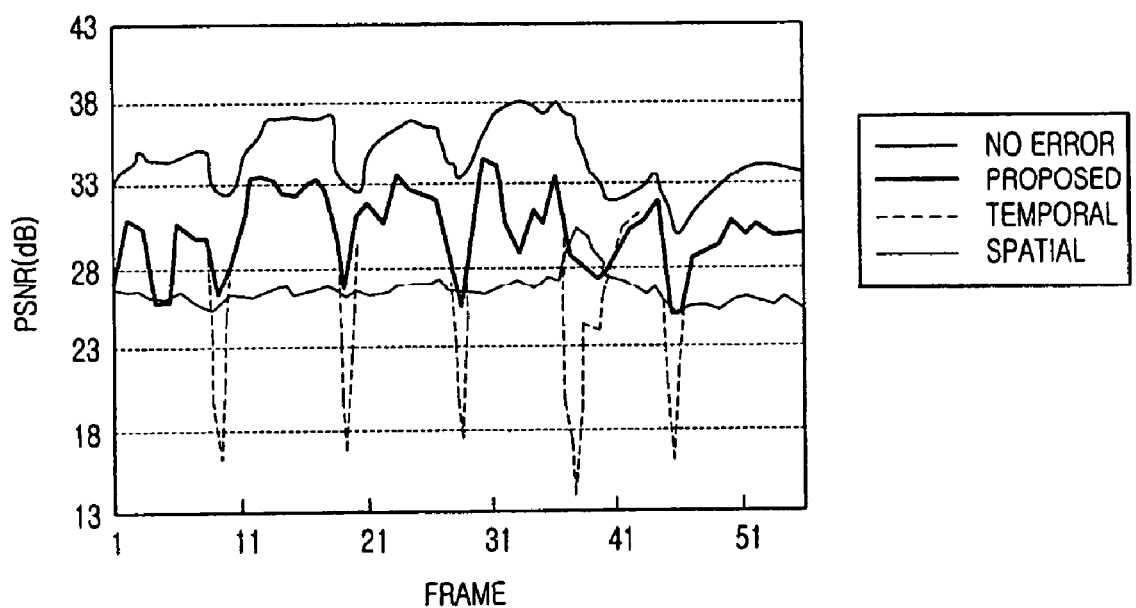
FIG. 5 is a graph showing PSNRs of each frame of a mixed image.

Turning next to FIGS. 4 to 5, which show a simulation result comparing a performance of the apparatus and method for recovering a lost block of an image processing system according to the present invention. In the simulation, an H.263 code was used, the size of an image was QCIF and CIF, and the target bit rates of QCIF and CIF were 112 Kbps and 322 Kbps, respectively.

First, FIG. 4 is a graph showing PSNRs (Peak Signal-to-Noise Ratios) of each frame of a foreman image, in which the temporal replacement concealment and the spatial concealment methods where flexibly applied. In other words, the performance of the temporal replacement concealment is good in most frames but the performance of the spatial concealment method is good in some frames with big motion. In the present invention, the spatial concealment method, not the temporal replacement concealment method, is applied to the frame where performance of the spatial concealment method is good.

Further, the PSNR indicates an objective evaluation of picture quality of a restored image, which means that the higher the PNSR, the higher the preservation rate of an origination image.

Next, FIG. 5 is a graph showing PSNRs of each frame of a mixed image, in which the portion where the PSNR changes rapidly is where a 'scene change' occurs.

In the present invention, at the portion where the 'scene change' occurs, the spatial concealment method is applied, and the temporal replacement concealment method is applied to the remaining portions.

As so far described, the apparatus and method for recovering a lost block of an image processing system of the present invention has many advantages.

For example, because characteristics of a block lost during transmission is automatically determined and the most suitable error concealment method is flexibly applied to restore an image, error restoration performance of a receiving end is improved.

In addition, because an image is restored by applying the most suitable error concealment method according to characteristics of the lost block, a restoration image closest to an original image is reproduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for recovering a lost block of an image comprising:

a lost block detector configured to determine whether there is a lost block in a received image block;

a pixel difference calculator configured to calculate a temporal difference value ($cost_1$) between adjacent pixels of a current frame with the lost block and a previous frame;

a variance value calculator configured to calculate a motion vector variance value ($cost_2$) of adjacent blocks to the lost block;

a block characteristic determining unit configured to determine characteristics of the lost block by comparing the temporal difference value ($cost_1$) and the motion vector variance value ($cost_2$) with a pre-set threshold value; and a lost block recovering unit configured to recover the lost block by applying an error concealment method based on the determined characteristics of the lost block, wherein the variance value calculator calculates the motion vector variance value ($cost_2$) using the following equations:

$$\cos t_2 = \sum_{i=1}^{7} MV_i^2 - \left[\sum_{i=1}^{7} MV_i\right]^2$$

$$MV_i = \sqrt{MV_{ix}^2 + MV_{iy}^2}$$

wherein $MV_{ix}$ and $MV_{iy}$ are horizontal and vertical components of $MV_i$, respectively.

2. The apparatus of claim 1, wherein the pixel difference calculator calculates the temporal difference value ($cost_1$) between adjacent pixels using the following equations:

$$\cos t_1 = \sum_{i=1}^{64} Diff_i$$

$$Diff_i = \begin{cases} 1 & \text{if } |curr_i - prev_i| \geq Threshold_{Diff} \\ 0 & \text{otherwise} \end{cases}$$

wherein $curr_i$ is pixel values around the lost block in the current frame and $prev_i$, is pixel values around a block placed at the same position as the current lost block of the previous frame.

3. The apparatus of claim 1, wherein when the temporal difference value ($cost_1$) between pixels and the motion vector variance value ($cost_2$) are equal to or less than a first threshold value (T1), the block characteristic determining unit determines the characteristics of the lost block as a first type, when the temporal difference value ($cost_1$) between pixels is equal to or greater than a second threshold value (T2) and the motion vector variance value ($cost_2$) is equal to or less than a third threshold value (T3), the block characteristic determining unit determines the characteristics of the lost block as a second type, when the temporal difference value ($cost_1$) between pixels is equal to or greater than the second threshold value (T2) and the motion vector variance value ($cost_2$) is equal to or greater than a fifth threshold value (T5), the block characteristic determining unit determines the characteristics of the lost block as a third type, and when the temporal difference value ($cost_1$) between pixels is equal to or greater than a fourth threshold value (T4), the block characteristic determining unit determines the characteristics of the lost block as a fourth type, where T1<T2<T3<T4<T5.

4. The apparatus of claim 3, wherein the first type is a block with little motion, the second type is a block having an image with a similar motion on the whole, the third type is a block having a subject moving without a certain directionality, and the fourth type is a block in which a screen change has occurred between image frames.

5. The apparatus of claim 1, wherein the error concealment method comprises:

a first method for recovering the lost block using a temporal method;

a second method for recovering the lost block using a spatial method; and a third method for recovering the lost block using a temporal error concealment method in consideration of motion.

6. The apparatus of claim 5, wherein the first method is applied when the lost block has little motion.

7. The apparatus of claim 5, wherein the second method is applied when the lost block has a subject moving without a certain directionality or the lost block is a block in which a screen change occurs between image frames.

8. The apparatus of claim 5, wherein the third method is applied when the lost block has an image having a similar motion on the whole.

9. A method for recovering a lost block of an image comprising:

determining characteristics of a lost block using a cost function with respect to the lost block, wherein determining the characteristics of the lost block comprises:

calculating a cost function with respect to the lost block, determining the characteristics of the lost block by comparing the cost function with a pre-set threshold value, wherein calculating the cost function comprises:

calculating a temporal difference value ($cost_1$) between pixels adjacent to the lost block with respect to a current frame and a previous frame; and calculating a motion vector variance value ($cost_2$) of a neighboring block with respect to the lost block; and recovering the lost block by applying an error concealment method based on the determined characteristics of the lost block, wherein the motion vector variance value ($cost_2$) of the neighboring block is calculated using the following equations:

$$\cos t_2 = \sum_{i=1}^{7} MV_i^2 - \left[\sum_{i=1}^{7} MV_i\right]^2$$

$$MV_i = \sqrt{MV_{ix}^2 + MV_{iy}^2}$$

wherein $MV_{ix}$ and $MV_{iy}$ are horizontal and vertical components of $MV_i$, respectively.

10. The method of claim 9, wherein the temporal difference value ($cost_1$) between pixels is calculated using the following equations:

$$\cos t_1 = \sum_{i=1}^{64} Diff_i$$

$$Diff_i = \begin{cases} 1 & \text{if } |curr_i - prev_i| \geq Threshold_{Diff} \\ 0 & \text{otherwise} \end{cases}$$

wherein $curr_i$ is pixel values around the lost block in the current frame and $prev_i$ is pixel values around a block placed at the same position as the current lost block of the previous frame.

11. The method of claim 9, wherein determining the characteristics of the lost block comprises:
determining the characteristic of the lost block as a first type when the temporal difference value ($cost_1$) between pixels and the motion vector variance value ($cost_2$) are equal to or less than a first threshold value (T1);
determining the characteristic of the lost block as a second type when the temporal difference value ($cost_1$) between pixels is equal to or greater than a second threshold value (T2) and the motion vector variance value ($cost_2$) is equal to or less than a third threshold value (T3);
determining the characteristic of the lost block as a third type when the temporal difference value ($cost_1$) between pixels is equal to or greater than the second threshold value (T2) and the motion vector variance value ($cost_2$) is equal to or greater than a fifth threshold value (T5); and
determining the characteristic of the lost block as a fourth type when the temporal difference value ($cost_1$) between pixels is equal to or greater than a fourth threshold value (T4), where T1<T2<T3<T4<T5.

12. The method of claim 11, wherein the first type is a block with little motion, the second type is a block having an image with a similar motion on the whole, the third type is a block having a subject moving without a certain directionality, and the fourth type is a block in which a screen change has occurred between image frames.

13. The method of claim 9, wherein recovering the lost block comprises:
recovering the lost block through a first method when the lost block is a first type;
recovering the lost block through a second method when the lost block is a third type or a fourth type; and
recovering the lost block through a third method when the lost block is a second type.

14. The method of claim 13, wherein the first method is a temporal method for substituting the lost block with a block placed at the same position as the previous frame.

15. The method of claim 13, wherein the second method is a spatial method for recovering the lost block by performing linear interpolation from adjacent pixels of the lost block.

16. The method of claim 13, wherein the third method is a temporal error concealment method based on motion for substituting the lost block with a block placed at a most suitable position of the previous frame using a motion vector of neighboring blocks of the lost block.

17. The method of claim 16, wherein the temporal error concealment method based on the motion comprises:
calculating an intermediate value of the neighboring motion vector of the lost block;
setting the intermediate value of the motion vector as a motion vector of the lost block; and
calculating a block of the optimum position of the previous frame and substituting the lost block.

18. A method for recovering a lost block of an image comprising:
checking whether there is a lost block in a transmitted image frame;
calculating a temporal difference value ($cost_1$) between pixels of a previous frame and pixels adjacent to the lost block of a current frame;
calculating a motion vector variance value ($cost_2$) of a neighboring block of the lost video block;
comparing the temporal difference value ($cost_1$) between the adjacent pixels and the motion vector variance value ($cost_2$) with a pre-set threshold value;
determining characteristics of the lost block according to a result of comparing the temporal difference value ($cost_1$) and the motion vector variance value ($cost_2$) with the pre-set threshold value; and
recovering the corresponding lost block with reference to the determined characteristics of the lost block,
wherein the motion vector variance value ($cost_2$) is calculated using the following equations:

$$cost_2 = \sum_{i=1}^{7} MV_i^2 - \left[\sum_{i=1}^{7} MV_i\right]^2$$

$$MV_i = \sqrt{MV_{ix}^2 + MV_{iy}^2}$$

wherein $MV_{ix}$ and $MV_{iy}$ are horizontal and vertical components of $MV_i$, respectively.

19. The method of claim 18, wherein the temporal difference value ($cost_1$) between pixels is calculated using the following equations:

$$cost_1 = \sum_{i=1}^{64} Diff_i$$

$$Diff_i = \begin{cases} 1 & \text{if } |curr_i - prev_i| \geq Threshold_{Diff} \\ 0 & \text{otherwise} \end{cases}$$

wherein $curr_i$ is pixel values around the lost block in a current frame and $prev_i$ is pixel values around a block placed at a same position as the current lost block of the previous frame.

20. The method of claim 18, wherein determining the characteristics of the lost block comprises:
determining the characteristic of the lost block as a first type when the temporal difference value ($cost_1$) between pixels and the motion vector variance value ($cost_2$) are equal to or less than a first threshold value (T1);
determining the characteristic of the lost block as a second type when the temporal difference value ($cost_1$) between pixels is equal to or greater than a second threshold value (T2) and the motion vector variance value ($cost_2$) is equal to or less than a third threshold value (T3);
determining the characteristic of the lost block as a third type when the temporal difference value ($cost_1$) between pixels is equal to or greater than the second threshold value (T2) and the motion vector variance value ($cost_2$) is equal to or greater than a fifth threshold value (T5); and
determining the characteristic of the lost block as a fourth type when the temporal difference value ($cost_1$) between pixels is equal to or greater than a fourth threshold value (T4), where T1<T2<T3<T4<T5.

21. The method of claim 20, wherein the first type is a block with little motion, the second type is a block having an image with a similar motion on the whole, the third type is a block having a subject moving without a certain directionality, and the fourth type is a block in which a screen change has occurred between image frames.

22. The method of claim 20, wherein recovering the lost block comprises:
   recovering the lost block through a first method when the lost block is the first type;
   recovering the lost block through a second method when the lost block is the third type or the fourth type; and
   recovering the lost block through a third method when the lost block is the second type.

23. The method of claim 22, further comprising:
   recovering the lost block through the third method when the lost block has characteristics other than the first to the fourth types.

24. The method of claim 22, wherein the first method is a temporal method for substituting the lost block with a block placed at the same position as the previous frame.

25. The method of claim 22, wherein the second method is a spatial method for recovering the lost block by performing linear interpolation from adjacent pixels of the lost block.

26. The method of claim 22, wherein the third method is a temporal error concealment method based on a motion for substituting the lost block with a block placed at a most suitable position of the previous frame using a motion vector of neighboring blocks of the lost block.

27. The method of claim 26, wherein the temporal error concealment method based on the motion comprises:
   calculating an intermediate value of the neighboring motion vector of the lost block;
   setting the intermediate value of the motion vector as a motion vector of the lost block; and
   calculating a block of the optimum position of the previous frame and substituting the lost block.

* * * * *